A. B. HAMILTON.
SPRING WHEEL.
APPLICATION FILED MAY 25, 1917.
1,253,965.
Patented Jan. 15, 1918.
2 SHEETS—SHEET 1.
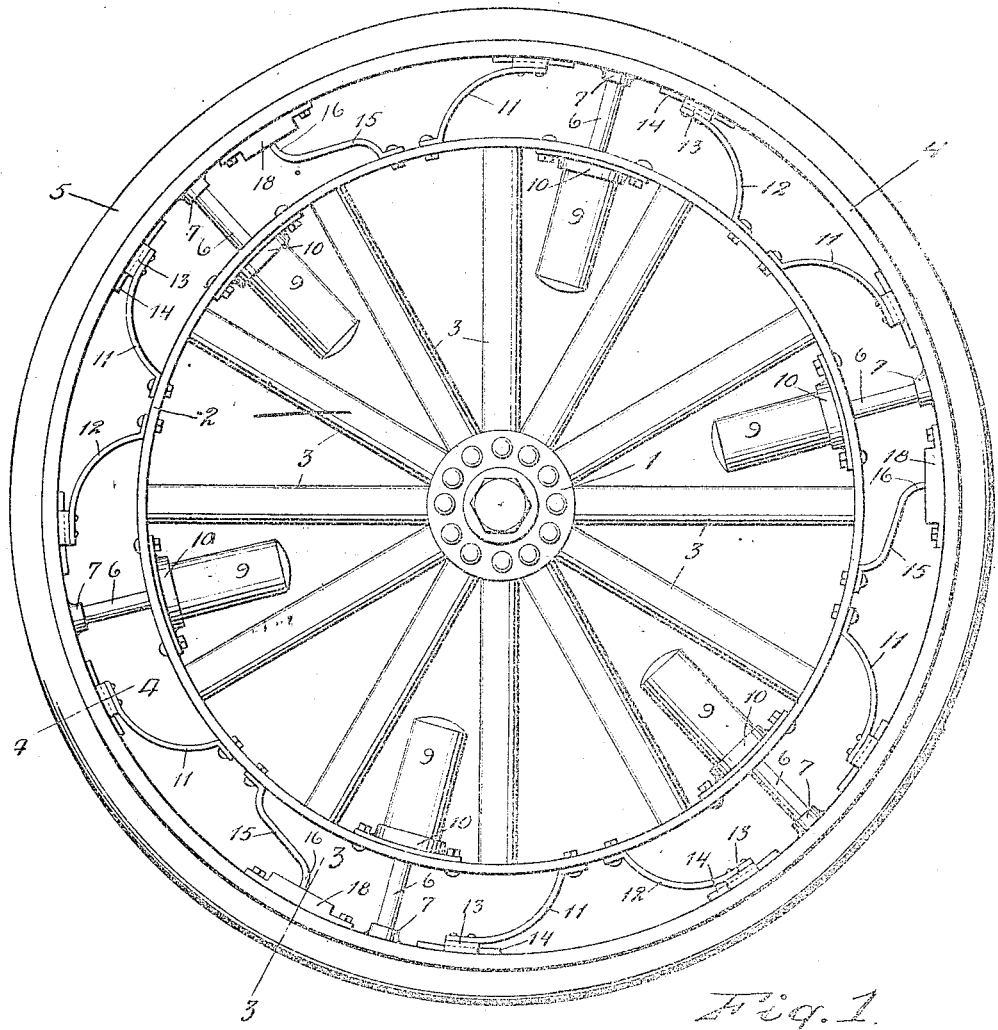
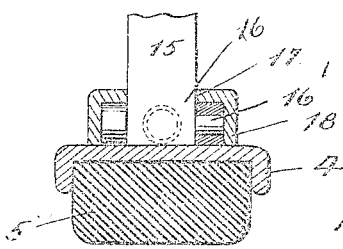
WITNESSES
INVENTOR
A. B. Hamilton
BY Victor J. Evans
ATTORNEY

A. B. HAMILTON.
SPRING WHEEL.
APPLICATION FILED MAY 25, 1917.

1,253,965.

Patented Jan. 15, 1918.
2 SHEETS—SHEET 2.

WITNESSES
J. M. Jester
Rodney M. Smith

INVENTOR
A. B. Hamilton
BY Victor J. Evans
ATTORNEY

UNITED STATES PATENT OFFICE.

AMOS B. HAMILTON, OF VISALIA, CALIFORNIA.

SPRING-WHEEL.

1,253,965.  Specification of Letters Patent.  Patented Jan. 15, 1918.

Application filed May 25, 1917. Serial No. 171,015.

*To all whom it may concern:*

Be it known that I, AMOS B. HAMILTON, a citizen of the United States, residing at Visalia, in the county of Tulare and State of California, have invented new and useful Improvements in Spring-Wheels, of which the following is a specification.

This invention relates to resilient wheels and more particularly to the tire construction thereof and has for one of its objects the provision of a spring wheel which gives the maximum resiliency, which has no puncturable parts, and which will take the place of the pneumatic tire now used so generally.

Another and more specific object of the invention is to provide a wheel having inner and outer rims, spring arms rigidly connected to the inner rim and having a sliding bearing on the outer rim, means for limiting the rotation of one rim relative to the other, and means for preventing a lateral movement of the rims in regard to each other.

The invention also aims to generally improve wheels of this nature to render them more useful, practical and commercially desirable.

With these and other objects in view as will become more apparent as the description proceeds, the invention consists in certain novel features of construction, combination and arrangement of parts as will be hereinafter fully described, illustrated and claimed.

In the drawings,

Figure 1 is a side elevation of my improved wheel.

Fig. 3 is a transverse sectional view on the plane of line 3—3 of Fig. 1.

Figure 2:
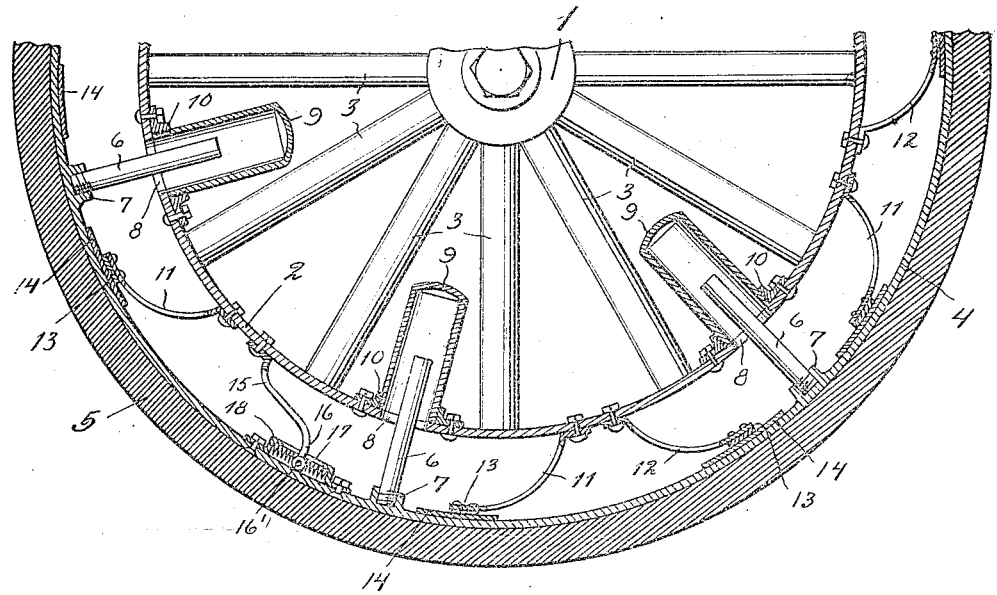
Fig. 2 is a central sectional view taken centrally between the side faces of the wheel and showing the lower half thereof.
Figures 4, 5, 6:
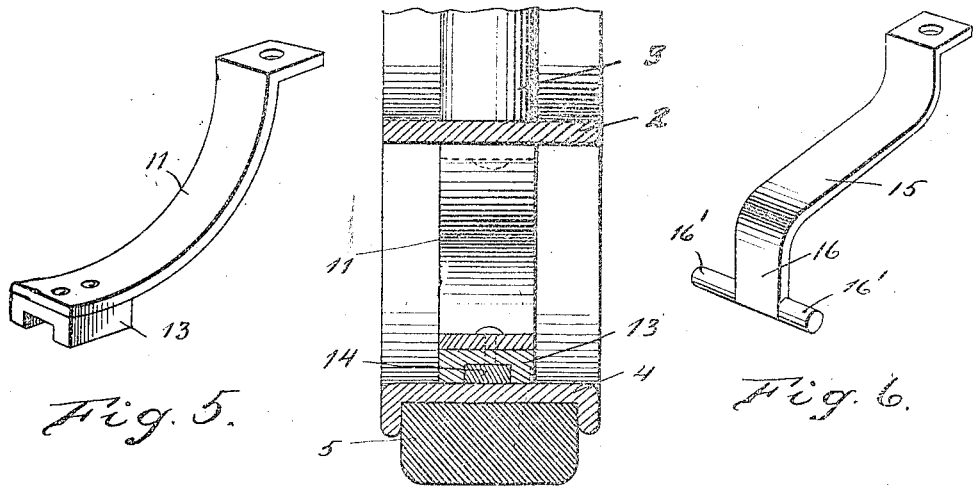
Fig. 4 is a section on the plane of line 4—4 of Fig. 1.
Fig. 5 is a detail perspective view of one of the spring arms.
Fig. 6 is a detail perspective view of a member to be hereinafter more fully described.

Referring in detail to the drawings by numerals, 1 designates the wheel hub which is connected to the inner rim 2 by a plurality of preferably steel spokes 3.

An outer rim 4 of greater diameter than the inner rim is arranged concentrically therearound and is spaced a considerable distance from the periphery thereof. This outer rim may be provided with a solid rubber tire 5 and is further equipped with a plurality of inwardly projecting radial pins 6. These pins are threaded externally adjacent their outer end portions for securement to the outer rim within the internally threaded bosses 7. The inner rim is formed with a plurality of circumferential slots 8 through which the pins 6 extend. The side walls of the slots engage the pins to hold them against lateral movement relative to the inner rim but the slots are of sufficient length to allow a slight rotation of the rims relative to each other. A cap or housing 9 is provided for each of the pins and these housings may be circular in cross section. The pins and housings are not arranged between each pair of spokes but between each alternate pair as I have found this disposition sufficient for the purpose intended.

The plurality of spring arms 11 and 12 are rigidly secured at their inner ends to the periphery of the inner rim, extend obliquely across the space between the two rims and have a sliding contact with the outer rim. These spring arms may be formed of flat resilient metal and are each provided on their outer ends with a shoe 13 which slides back and forth on a guide 14 secured to the inner face of the outer rim.

To limit the relative rotation of the two rims with relation to each other without diminishing the resiliency of the wheel, I provide a plurality of pull bars 15 which are of resilient metal, which extend obliquely across the space between the rims and which are rigidly secured at their inner ends to the inner rim. Each pull bar is bent adjacent its outer end at substantially right angles to the central portion of the bar to form a tongue 16 which extends through a slot 17 in a bracket 18 secured to the inner side of the outer rim. The main portion of the bracket is spaced from the outer rim by the outturned ends of the bracket and the slot 17 in this main or central portion runs longitudinally thereof. Within the slot on each side of the tongue is mounted a coil spring which will cushion the tongue and bring it to a gradual stop.

The spring arms 11 and 12 are arranged in pairs, one pair to incline outwardly toward the corresponding pin. I have found three pull bars to be sufficient to preserve the balance of the wheel and prevent relative rotation of the two rims and where these pull bars are used, they take the place of the spring arms. When the wheel is working, the shoes slide back and forth on their guides and the pull bars have a circumferential play within the slots of the brackets.

From the foregoing description taken in connection with the accompanying drawings, it will be evident that I have provided a very simple and practical spring wheel which has very substantial parts, removably connected in most instances, so as to be replaceable by similar parts if occasion arises.

While I have shown and described the preferred embodiments of my invention, it will be clearly understood that I do not wish to be limited to this construction, but may make such changes as will fall within the scope and spirit of the invention as claimed.

What I claim is:—

1. In a wheel, an inner rim, an outer rim concentric with the inner rim and of greater diameter, spring bars connected to the inner rim and extending outwardly and having the outer ends bearing against said outer rim, slotted brackets secured to the outer rim through which said bars extend, each bar having lateral extensions on the outer end engaged between the particular bracket and the outer rim, said extensions bearing against said brackets on each side of the slots in the brackets to prevent displacement of said bars from said brackets, and a pair of circumferentially disposed springs within each bracket, said springs bearing against the particular bar from opposite directions.

2. In a wheel, an inner rim, an outer rim concentric with the inner rim and of greater diameter, spring bars connected to the inner rim and extending outwardly so that a line connecting the ends of a particular bar will be disposed diagonally and having the outer ends bent to extend radially and bearing against said outer rim, slotted brackets secured to the outer rim through which said bars extend, each bar having lateral extensions on the outer end engaged between the particular bracket and the outer rim, said extensions bearing against said brackets on each side of the slots in the brackets to prevent displacement of said bars from said brackets, and a pair of circumferentially disposed springs within each bracket, said springs bearing against the particular bar from opposite directions.

3. In a wheel, an inner rim, an outer rim concentric with the inner rim and of greater diameter, spring bars connected to the inner rim and extending outwardly so that a line connecting the ends of a particular bar will be disposed diagonally and having the outer ends bent to extend radially and bearing against said outer rim, the inner and outer end portions of said bars bent to extend radially and the portions intermediately between said end portions extending substantially circumferentially, slotted brackets secured to the outer rim through which said bars extend, each bar having lateral extensions on the outer ends engaged between the particular bracket and the outer rim, said extensions bearing against said brackets on each side of the slots in the brackets to prevent displacement of said bars from said brackets, and a pair of circumferentially disposed springs within each bracket, said springs bearing against the particular bar from opposite directions.

4. In a wheel of the character described, an inner rim, an outer rim, means for preventing a lateral movement of said rims relative to each other, spring arms secured to the inner rim and having a sliding engagement with the outer rim, spring pull bars secured to the inner rim and extending diagonally toward the outer rim, circumferentially slotted brackets secured to the outer rim through which the pull bars extend and springs mounted within said brackets to cushion the pull bars and limit their movement relative to the outer rim, and lateral extensions on the outer ends of said pull bars, said extensions slidably engaged between said brackets and said outer rim.

In testimony whereof I affix my signatu"

AMOS B. HAMILTON